(12) United States Patent
Ueda et al.

(10) Patent No.: US 6,377,743 B1
(45) Date of Patent: Apr. 23, 2002

(54) OPTICAL FIBER HOLDER

(75) Inventors: Tomohiko Ueda; Kenichiro Ohtsuka; Toshiaki Kakii, all of Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/673,142
(22) PCT Filed: Feb. 23, 2000
(86) PCT No.: PCT/JP00/01018
  § 371 Date: Oct. 11, 2000
  § 102(e) Date: Oct. 11, 2000
(87) PCT Pub. No.: WO00/50939
  PCT Pub. Date: Aug. 31, 2000

(30) Foreign Application Priority Data

Feb. 23, 1999 (JP) .............................. 11-044604

(51) Int. Cl.⁷ .................................................. G02B 6/00
(52) U.S. Cl. ....................................................... 385/137
(58) Field of Search .................... 385/95, 96, 134–136, 385/147

(56) References Cited

U.S. PATENT DOCUMENTS

| | | | |
|---|---|---|---|
| 5,472,160 A | * 12/1995 | Burek et al. | 248/74.4 |
| 5,519,804 A | * 5/1996 | Burek et al. | 385/135 |
| 5,524,167 A | * 6/1996 | Ewert et al. | 385/137 |
| 5,963,699 A | 10/1999 | Tanaka et al. | |

FOREIGN PATENT DOCUMENTS

JP  9-318836  12/1997

* cited by examiner

*Primary Examiner*—Akm E. Ullah
(74) *Attorney, Agent, or Firm*—McDermott, Will & Emery (57) ABSTRACT

An optical fiber holder 1B is an optical fiber holder for holding a plurality of optical fibers in line, and includes a base member 20 with a plurality of parallel positioning grooves 90 for positioning and aligning the plurality of optical fibers, and a lid member 32 adapted to cover the plurality of positioning grooves 90 and to fix the plurality of optical fibers, arranged in the positioning grooves 90, by pressing against the bottom portions of the positioning grooves 90. The lid member 32 has small projections 102 on its portion which comes into contact with the optical fibers.

10 Claims, 13 Drawing Sheets

OPTICAL FIBER HOLDER

TECHNICAL FIELD

The present invention relates to an optical fiber holder such as a mechanical splicing or clamping type optical connector for holding optical fibers by vertically sandwiching them.

BACKGROUND ART

Conventionally, an optical fiber holder for holding optical fibers by vertically sandwiching them such as a mechanical splicing or clamping type optical connector, is known. As an example of such a mechanical splicing optical connector, one described in Japanese Patent Laid-Open No. 9-318836 is known.

Although optical fibers held by such an optical fiber holder are manufactured to have a predetermined diameter, they inevitably have small diameter errors due to manufacturing errors. For example, a generally widely used optical fiber with a nominal diameter of 125 µm usually has a diameter error of approximately 1 µm to several micrometers.

DISCLOSURE OF INVENTION

Figure 12:
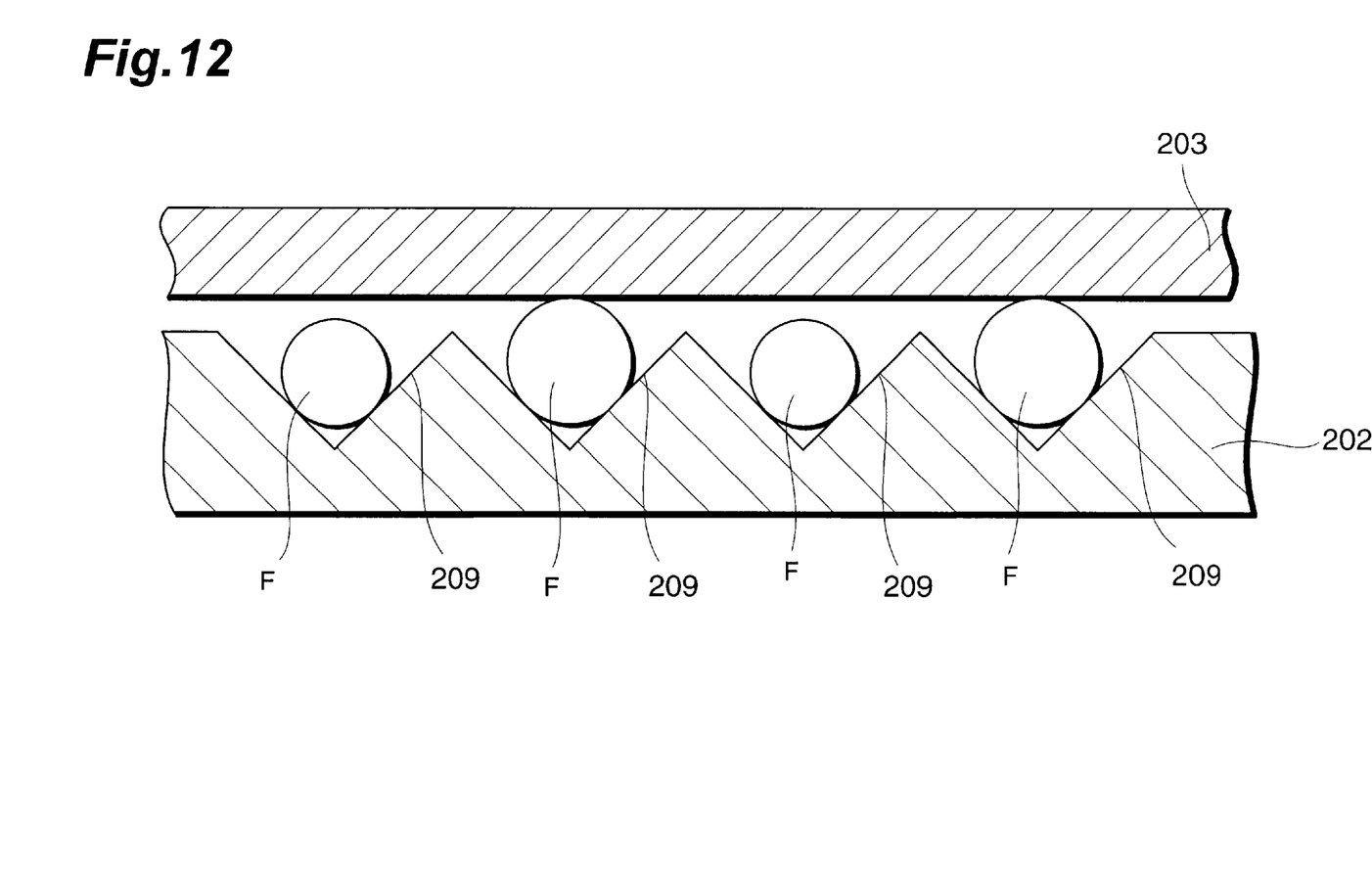
FIG. 12 is a cross-sectional view showing a state wherein a plurality of optical fibers are held by a conventional holder.
Figure 13:
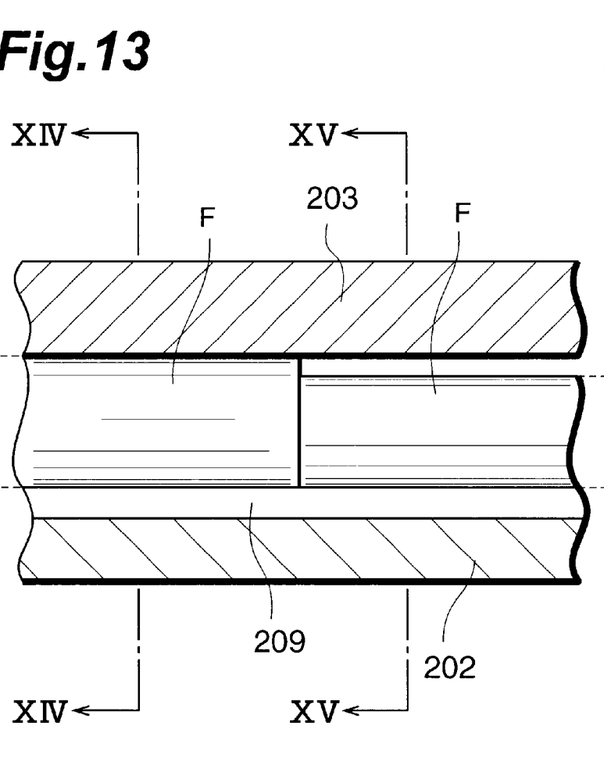
Figure 14:
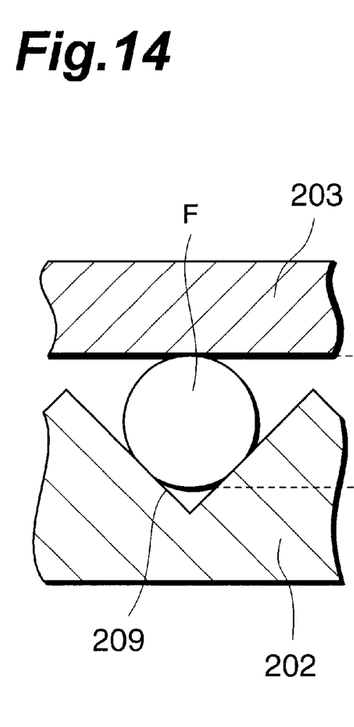
Figure 15:
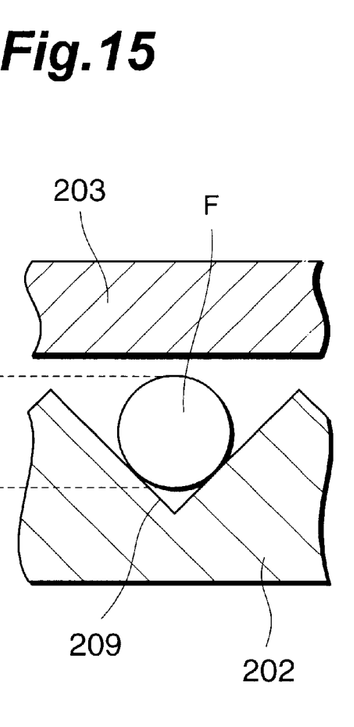

Since the diameters of optical fibers have small errors in this manner, when a plurality of optical fibers are to be held by vertically sandwiching them with a holder as described above, they sometimes cannot be held reliably. FIGS. 12 to 15 show such a situation. FIG. 12 is a cross-sectional view showing a holder for holding optical fibers F parallel to each other. FIGS. 13 to 15 show a holder for holding optical fibers F by butting them face to face, in which FIG. 13 is a longitudinal sectional view and FIGS. 14 and 15 are cross-sectional views taken at the respective optical fiber F portions. In FIGS. 12 to 15, diameter errors between the optical fibers F and the gap between members 202 and 203 of the holder are emphasized to be larger than they really are.

Each of these holders is comprised of a base member 202 having positioning grooves 209 with V-shaped sections for positioning and aligning the optical fibers F, and a lid member 203 for fixing the optical fibers F placed in the positioning grooves 209 by pressing them against the bottom portions of the positioning grooves 209. When optical fibers F with different diameters are to be sandwiched and held, those with larger diameters are pressed by the lid member 203 against the bottom portions of the positioning groove 209, but those with small diameters form a gap with the lid member 203 (or the bottom portions of the positioning grooves 209). Hence, these optical fibers F are not pressed against the bottom portions of the positioning grooves 209 and accordingly are not held reliably.

If optical fibers F are not reliably held in this manner, as the temperature changes, they may move in the axial direction due to a difference in coefficient of linear expansion between the optical fibers and the respective members. Consequently, a gap is formed between the end faces of the opposing optical fibers F, and the transmission loss increases. If optical fibers F are not reliably held, they undesirably move, even if slightly, within the positioning grooves 209 in the direction of their cross-sections. Then, as shown in FIG. 13, the core positions of the opposing optical fibers F are misaligned from each other, increasing the transmission loss.

In view of the above problems, the present invention has as its object to provide an optical fiber holder which, when holding a plurality of optical fibers by sandwiching them, can reliably hold all the optical fibers even if their diameters may slightly differ due to a size error or the like.

In order to achieve the above problems, an optical fiber holder according to the present invention comprises a base member with a plurality of parallel positioning grooves for positioning and aligning the plurality of optical fibers, a lid member covering the plurality of positioning grooves to fix the plurality of optical fibers, arranged in the positioning grooves, by pressing against bottom portions of the positioning grooves, and small projections with a height from 1 µm to 3 µm inclusive formed on a contacting portion of at least either one of said lid member and said positioning grooves to contact with each of the optical fibers.

Alternatively, an optical fiber holder according to the present invention may comprise a base member with at least one positioning groove for positioning and aligning the opposing optical fibers, a lid member covering the positioning groove, to fix the optical fibers, arranged in the positioning groove to oppose each other, by pressing against a bottom portion of the positioning groove, and small projections with a height from 1 µm to 3 µm inclusive formed on a contacting portion of at least either one of said lid member and said positioning grooves to contact with each of the optical fibers.

With the optical fiber holder according to the present invention, even if the plurality of optical fibers which are arranged parallel to each other or face to face have a diameter error, when the lid member presses the optical fibers against the bottom portion of the positioning groove, the small projections formed on the lid member or positioning groove which comes into contact with the optical fibers deform in accordance with the diameters of the optical fibers. Consequently, each one of the plurality of optical fibers is pressed and reliably held at the bottom portion of the positioning groove without forming a gap with the surface of the lid member or the wall surface of the positioning groove. As a result, the optical fibers are held reliably, so the transmission characteristics do not degrade.

A recess may be formed close to the small projection. When the recess is formed, the deformed portion of the small projection can escape into the recess, and the small projection can deform easily. As a result, the small projection can deform more easily in accordance with the diameter of the optical fiber, and the optical fiber can be held more reliably.

These small projections may be formed on the lid member and may have a semicylindrical shape extending in a direction perpendicular to the direction in which the positioning groove extends. When the small projection is formed with a semicylindrical shape, the contact between the optical fiber in the positioning groove and the small projection starts in the form of point contact, and its contact area increases as the small projection deforms. Since the contact between the optical fiber and small projection starts in the form of point contact, the force acting between the optical fiber and small projection is concentrated on one point, and the small projection tends to deform easily. When deformation of the small projection progresses, the force acting between the optical fiber and small projection is dispersed over a certain area. Therefore, no local excessive load may act on the optical fiber, and no adverse influence is inflicted on the transmission characteristics.

Alternatively, the small projections may arrange on a wall surface of the lid member or positioning groove at an interval of not more than 0.5 mm. When the plurality of small projections are arranged close to each other, the optical fibers can be held reliably upon deformation of the small projections, and stress accompanying the deformation is prevented from locally acting on the optical fibers.

One of the base member and lid member which has the small projections may be made of a member with a larger elasticity than that of the other. When the base member and lid member are made of different materials and the member with the small projection is made of a member softer than that of the other member, the projection itself deforms more easily, while deformation of the remaining member is suppressed. Inconveniences such as occurrence of a nonuniform stress and misalignment of the optical fibers, which are caused by nonuniform deformation of the small projection, can be suppressed.

BRIEF DESCRIPTION OF DRAWINGS

FIGS. 13 to 15 are views showing a state wherein optical fibers butting face to face are held by a conventional holder, in which FIG. 13 is a longitudinal sectional view, and FIGS. 14 and 15 are cross-sectional views taken at the respective optical fiber holding portions.

BEST MODE OF CARRYING OUT THE INVENTION

The preferable embodiments of the present invention will be described in detail with reference to the accompanying drawings. To facilitate the comprehension of the explanation, the same reference numerals denote the same parts, where possible, throughout the drawings, and a repeated explanation will be omitted. In the drawings, deformation of small projections, a gap around optical fibers, and the like are emphasized to be larger than they really are, and do not match the actual size ratio.

Figure 1:
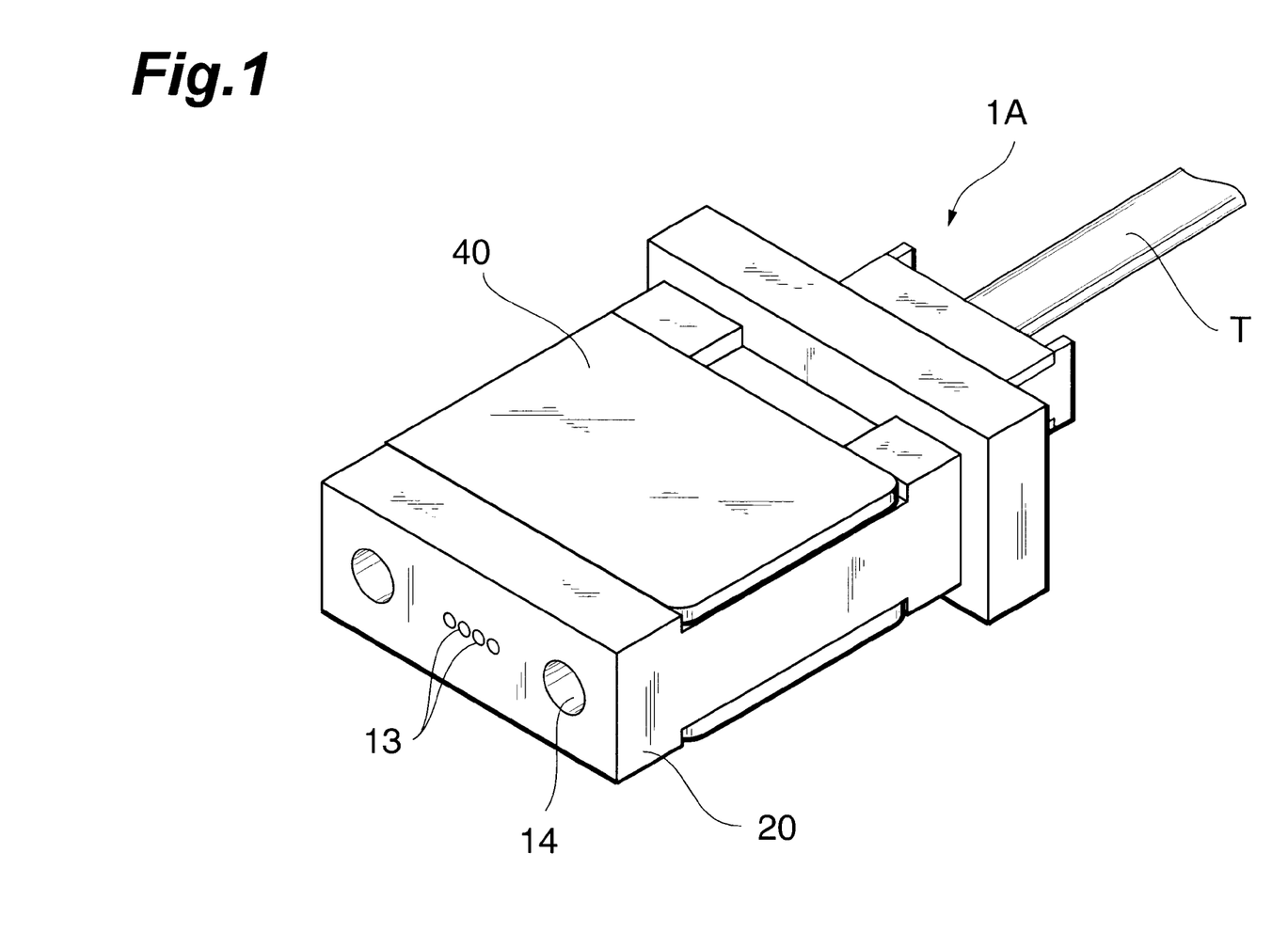
FIG. 1 is a perspective view showing a state wherein optical fibers are fixed in an optical fiber holder according to the first embodiment of the present invention.
Figure 2:
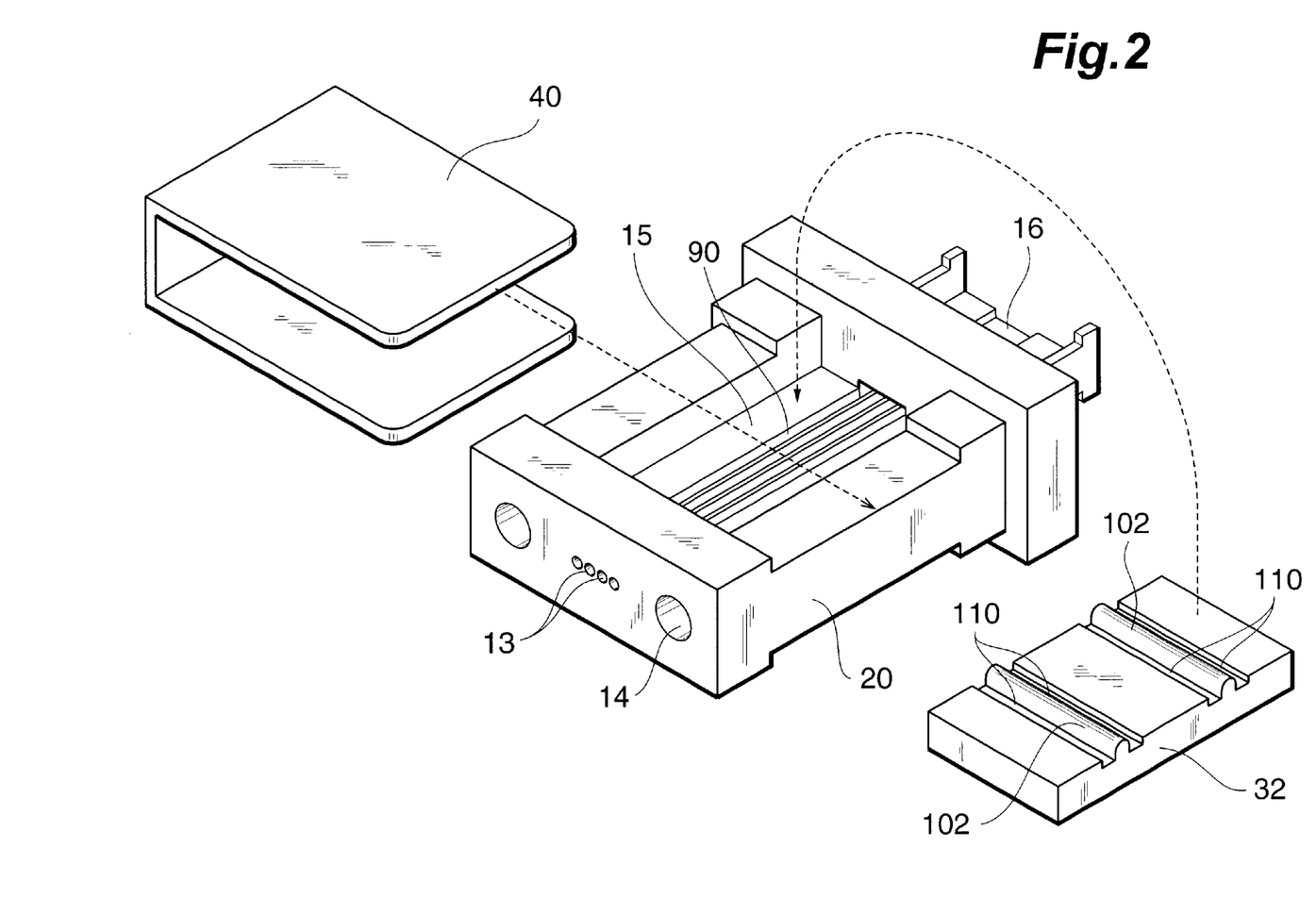
FIG. 2 is an exploded perspective view of the holder shown in FIG. 1.

FIGS. 1 and 2 show an optical fiber holder according to the first embodiment 1A of the present invention. As shown in FIGS. 1 and 2, the holder 1A of this embodiment is comprised of a base member 20 or a so-called ferrule, a lid member 32 received in the base member 20, and a clamper 40 for sandwiching the base member 20 and lid member 32. The holder 1A of this embodiment is abutted against another holder 1A (not shown), so that optical fibers in the two holders are optically connected to each other. For this purpose, the end portions of optical fiber receiving holes 13 for accommodating the distal end portions of the optical fibers, and the end portions of pin insertion holes 14 in which guide pins for positioning the holder 1A are to be inserted, are formed in the distal end face of the base member 20.

The base member 20 is made of a synthetic resin, e.g., a glass-filament-reinforced epoxy-based resin or LCP (Liquid Crystal Polymer), and has an receiving cavity 15 at its center to accommodate the lid member 32. Four positioning grooves 90 for positioning the optical fibers are formed parallel to each other in the bottom portion of the receiving cavity 15. The positioning grooves 90 communicate with the corresponding optical fiber receiving holes 13 described above. The end portions of the positioning grooves 90, on a side opposite to the optical fiber receiving holes 13, communicate with a cable insertion hole 16.

The positioning grooves 90 have V-shaped sections, and their depths are set shallow so that the side surfaces of received optical fibers F partly project from the grooves. Therefore, when the optical fibers received in the positioning grooves 90 are pressed by the lid member 32 against the V-shaped bottom portions of the positioning grooves 90, the optical fibers F can be positioned and aligned.

The lid member 32 has a size substantially equal to that of the inner space of the receiving cavity 15 described above, and is made of the same synthetic resin as that used for forming the base member 20. FIG. 2 shows a state wherein the lid member 32 is turned upside down. The base member 20 and lid member 32 sandwich the optical fibers F. Two parallel small projections 102 with semicylindrical sections are formed at that portion of the lid member 32 which comes into contact with the optical fibers, i.e., at that portion of the lid member 32 which faces the positioning grooves 90.

Each small projection 102 is formed to extend over all the four positioning grooves 90. Each small projection 102 is formed perpendicularly to the positioning grooves 90. In other words, each small projection 102 extends perpendicularly to the axial directions of the optical fibers to be received. Two rectangular recesses 110 are formed in contact with the two sides of each small projection 102.

The clamper 40 sandwiches the base member 20 accommodating the lid member 32 in it, and is made of a metal such as stainless steel having an elastic restoring force. The clamper 40 sandwiches the base member 20 and lid member 32 such that they are in tight contact with each other. When optical fibers are to be held, a ribbon optical fiber cable T with optical fibers being exposed at its distal end is inserted from the cable insertion hole 16, and the optical fibers are received in the positioning grooves 90 and optical fiber receiving holes 13. After that, the lid member 32 is received in the receiving cavity 15, and the clamper 40 is attached to the base member 20.

Since the elastic restoring force of the clamper 40 presses the lid member 32 and base member 20 toward each other, the optical fibers are pressed by the small projections 102 against the bottom portions of the positioning grooves 90.

Even if the plurality of optical fibers have a small diameter error due to a manufacturing error or the like, the small projections 102 deform, even if slightly, in accordance with the diameters of the respective optical fibers. As a result, each optical fiber is held reliably as it is pressed by the small projections 102 against the bottom portions of the positioning grooves 90.

Figure 3:
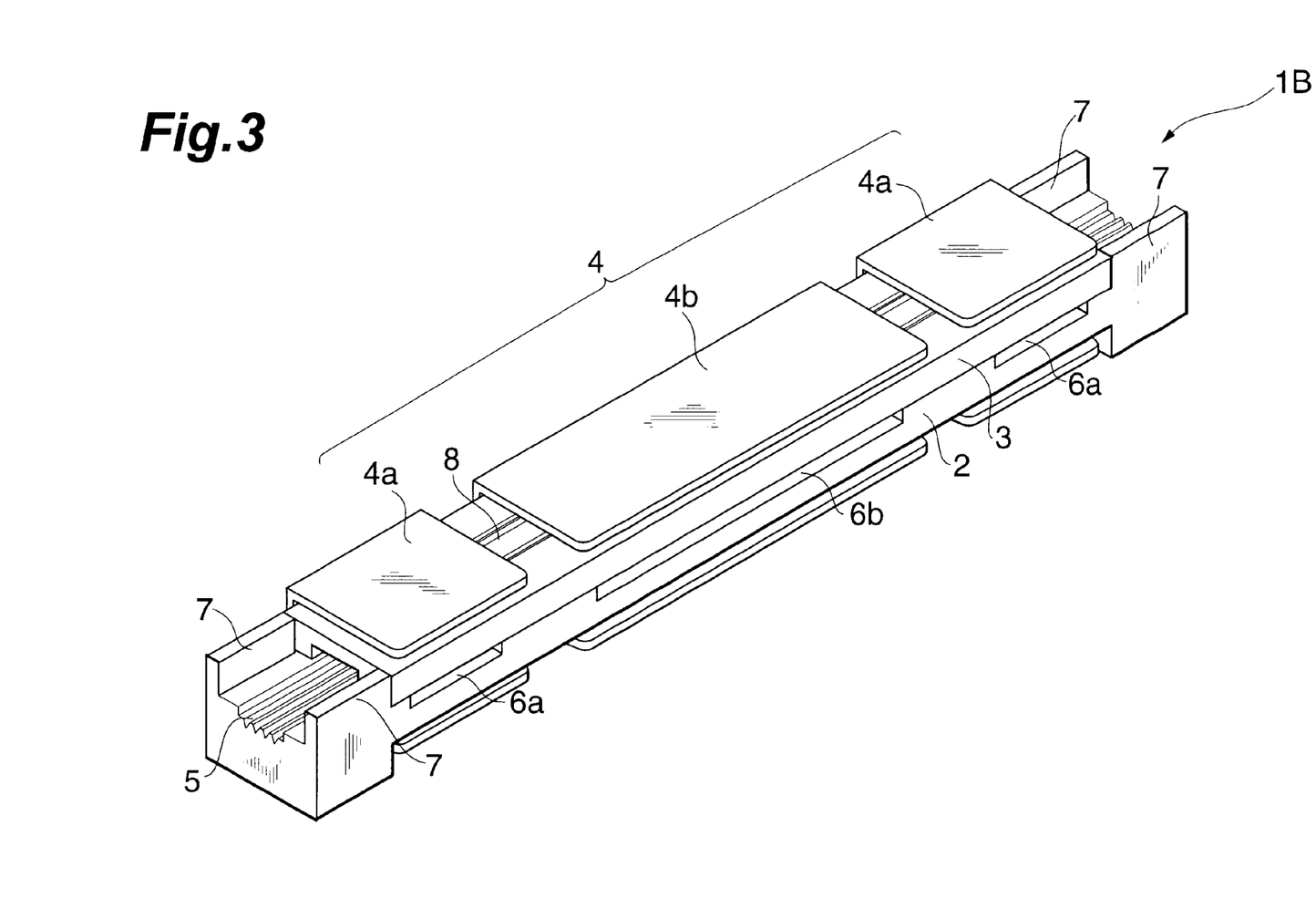
FIG. 3 is a perspective view showing an optical fiber holder according to the second embodiment of the present invention.
Figure 4:
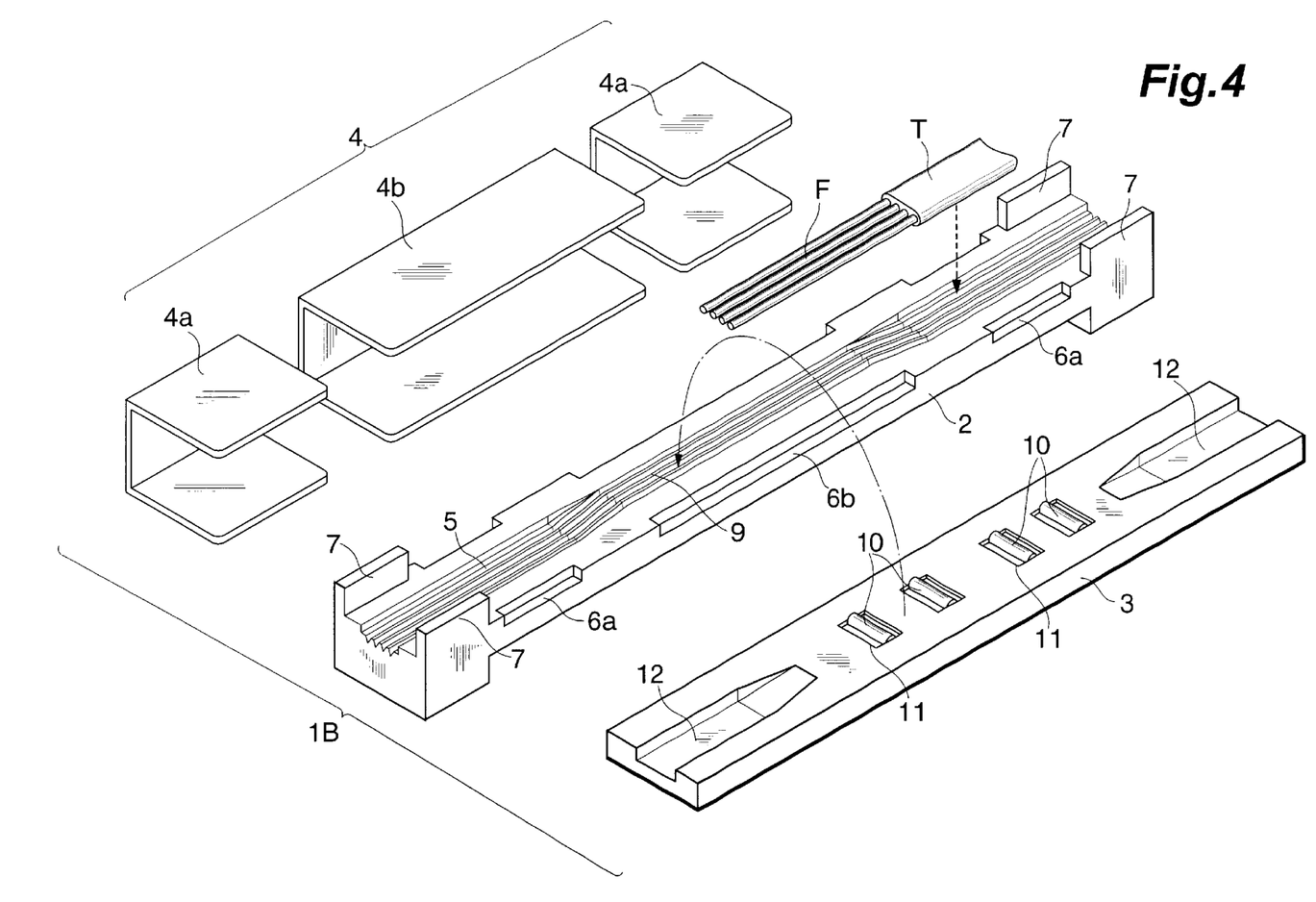
FIG. 4 is an exploded perspective view of the same showing optical fibers as well for the sake of description.

The embodiment described above is a mechanical clamping type optical connector which holds a plurality of optical fibers F by aligning them parallel to each other. However, as shown in FIGS. 3 and 4, this embodiment can also be applied to a mechanical splicing optical connector which holds optical fibers F face to face. The second embodiment of the present invention shown in FIGS. 3 and 4 will be described.

A holder 1B according to this embodiment is a multi-fiber mechanical splicing optical connector, and is comprised of a base member 2, lid member 3, and clamper 4, as shown in FIGS. 3 and 4.

The base member 2 is made of a synthetic resin, e.g., a glass-filament-reinforced epoxy-based resin, and has four parallel positioning grooves 9 at the central portion of its surface for positioning and aligning optical fibers F. Guide grooves 5 which continue to the positioning grooves 9 are formed at the two end portions of the base member 2, so that the optical fibers F can be easily guided to the positioning grooves 9. The guide grooves 5 are formed at positions lower than the positioning grooves 9 by one level, and their portions on the side of the positioning grooves 9 form tilted portions continuously connected to the positioning grooves 9.

The guide grooves 5 and positioning grooves 9 have V-shaped sections. The depths of the positioning grooves 9 are set shallow so that the side surfaces of the received optical fibers F partly project from the positioning grooves 9. Therefore, when the optical fibers F received in the positioning grooves 9 are pressed by the lid member 3 against the V-shaped bottom portions of the positioning grooves 9, they can be positioned and aligned. Flat portions, even if small, are formed among the positioning grooves 9 (see FIG. 6). If portions among the positioning grooves 9 are formed sharp, they may break easily. Flat portions are formed among the positioning grooves 9 to prevent this.

A pair of positioning walls 7 vertically run upright, on the two sides of the guide grooves 5 at each end portion of the base member 2, from the surface of the base member 2. The pair of positioning walls 7 are formed at each of the two end portions of the base member 2. Also, wedge inserting portions 6a and 6b are formed at two edge portions of the base member 2. The wedge inserting portions 6a and 6b are divided into three on each edge portion. The wedge inserting portion 6b is arranged at the center in the longitudinal direction of the base member 2, and the wedge inserting portions 6a are arranged on two sides of the central wedge inserting portion 6b.

The lid member 3 has a width equal to that of the base member 2 described above and a length equal to the distance between the positioning walls 7 formed on each of the two ends of the base member 2, and is made of the same synthetic material as that of the base member 2. FIG. 4 shows a state wherein the lid member 3 is turned upside down. The base member 2 and lid member 3 sandwich the optical fibers F. In this case, the lid member 3 is positioned by the positioning walls 7 formed at the two ends of the base member 2.

Small projections 10 with semicylindrical sections are formed at that portion of the lid member 3 which comes into contact with the optical fibers F, i.e., at that portion of the lid member 3 which faces the positioning grooves 9 when the lid member 3 is placed on the base member 2. In this embodiment, two small projections 10 are formed for each pair of optical fibers F butting face to face (only one pair is shown in FIG. 4); a total of four small projections 10 are formed.

Each small projection 10 is formed to extend over all the four positioning grooves 9. Each small projection 10 extends perpendicularly to the positioning grooves 9. In other words, each small projection 10 extends perpendicularly to the axial directions of the optical fibers F. Each small projection 10 extends perpendicularly to the semicylindrical section. The small projections 10 press the optical fibers F against the V-shaped bottom portions of the positioning grooves 9. A recess 11 is formed close to each small projection 10. In this embodiment, two rectangular recesses 11 are formed in contact with the two sides of each small projection 10.

The small projections 10 slightly deform on the order of micrometers when pressing the optical fibers F against the bottom portions of the positioning grooves 9. The synthetic resin usually employed to manufacture the mechanical splicing optical connector also deforms likewise. Thus, if the whole lid member 3 is to be integrally formed of such a synthetic resin, it can be manufactured easily.

Flat grooves 12 are formed on the two ends of the lid member 3 so as to face the guide grooves 5 of the base member 2 when the lid member 3 is placed on the base member 2. The flat grooves 12, together with the spaces above the guide grooves 5 of the base member 2, form spaces for accommodating the coatings of ribbon optical fiber cables T. A portion of each flat groove 12 on the side of the small projections 10 forms a tilted surface to guide the optical fibers F to the positioning grooves 9 together with the tilted portions of the guide grooves 5.

A hill-like elongated projection 8 is formed on that surface of the lid member 3, where no small projections 10 are formed, throughout substantially the entire length of the lid member 3 (see FIG. 3). When the base member 2 and lid member 3 that are combined with each other are sandwiched by the clamper 4 (to be described later), the elongated projection 8 comes into linear contact with the clamper 4. As a result, the angle of the lid member 3 is automatically adjusted such that the base member 2 and lid member 3 comes into more tight contact with each other, and substantially uniform pressures act on the optical fibers F which are arranged parallel to each other.

The clamper 4 is divided into three portions consisting of a clamper 4b for sandwiching the central portions of the base member 2 and lid member 3 combined with each other, and clampers 4a for sandwiching the two sides of the central portions of the base member 2 and lid member 3. The attaching positions of the clampers 4a substantially correspond to the positions of the wedge inserting portions 6a described above, and the attaching position of the clamper 4b substantially corresponds to the position of the wedge inserting portions 6b. The clamper 4 is made of a metal, e.g., stainless steel, having an elastic restoring force, and sandwiches the base member 2 and lid member 3 to be in tight contact with each other.

The holder 1B described above is usually assembled in the state shown in FIG. 3, and two ribbon optical fiber cables T are attached to the holder 1B. The coatings of the ribbon optical fiber cables T to be attached are stripped from their distal end portions to expose the internal optical fibers F. The distal ends of the plurality of exposed optical fibers F are aligned. Subsequently, a special tool (not shown) with wedges is used. The wedges of the special tool are inserted in the wedge inserting portions 6a and 6b, thus forming a small gap between the base member 2 and lid member 3.

In this state, the optical fibers F are received one by one in the respective guide grooves 5 between the pair of positioning walls 7 of the holder 1B. When the ribbon optical fiber cables T are inserted into the holder 1B, the respective optical fibers F are guided by the guide grooves 5 and received in the positioning grooves 9. This operation is performed at the two ends of the holder 1B. When one pair of ribbon optical fiber cables T are inserted and the end faces of the optical fibers F are abutted against each other in the holder 1B, the wedges of the special tool are removed from the wedge inserting portions 6a and 6b. A refractive index matching agent for preventing degradation of transmission loss may preferably fill the portion where the end faces of the optical fibers F abut against each other.

Figure 5:
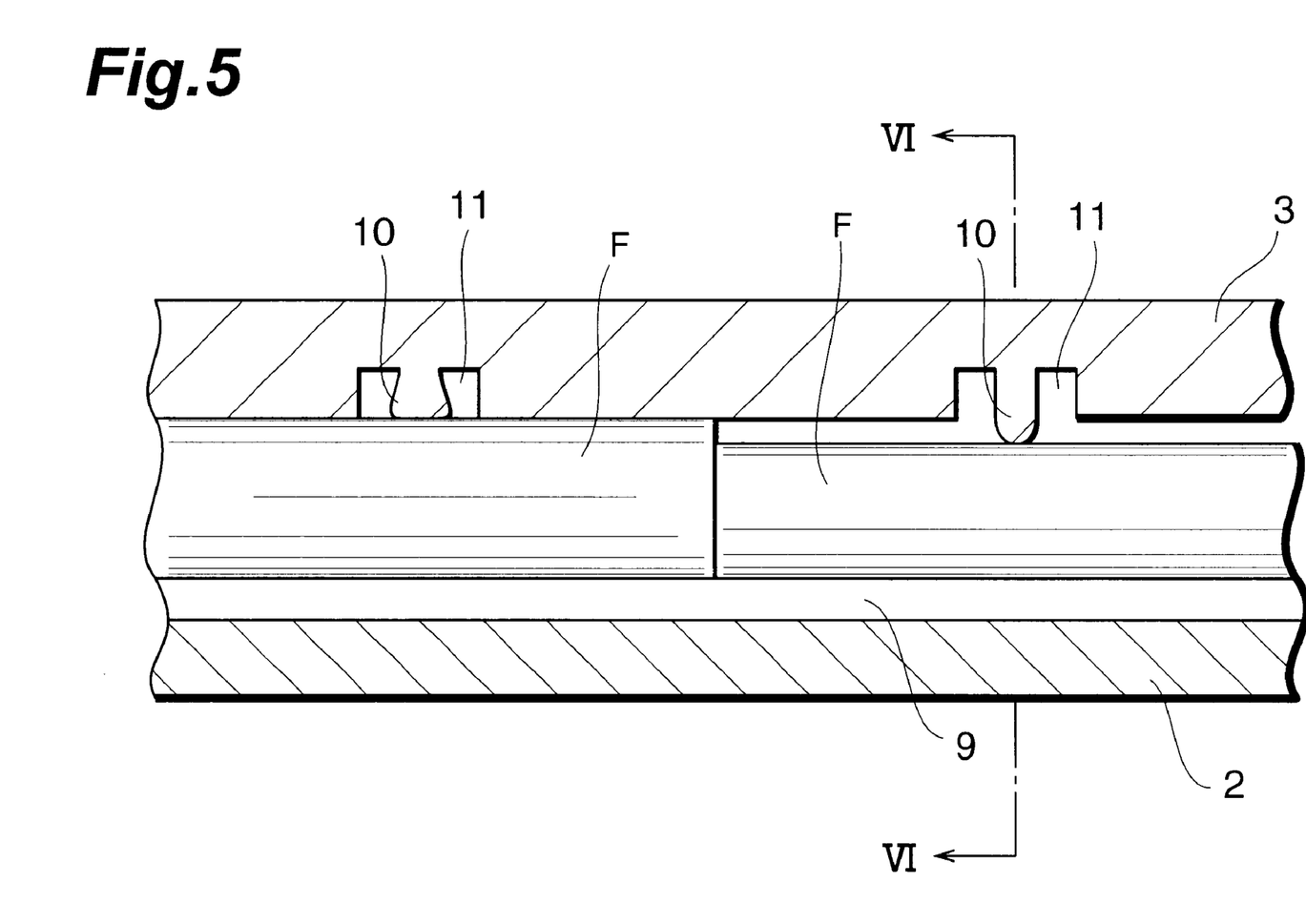
FIGS. 5 and 6 are longitudinal sectional and cross-sectional views, respectively, showing a state wherein optical fibers are held by the holder shown in FIG. 3.

Since the elastic restoring force of the clamper 4 presses the lid member 3 and base member 2 toward each other, the optical fibers F are pressed by the small projections 10 against the bottom portions of the positioning grooves 9. Even if the opposing optical fibers F have a small diameter error due to a manufacturing error or the like, the small projections 10 which come into contact with the optical fibers F deform in accordance with the diameters of the optical fibers F, as shown in FIG. 5. As a result, each optical fiber F is held reliably as it is pressed by the small projections 10 against the bottom portions of the positioning grooves 9.

As shown in FIG. 5, when optical fibers F with different diameters are positioned reliably, in the strict sense an error occurs between their central axes. However, this error falls within an allowable range in terms of transmission characteristics and therefore does not pose any problem.

Figure 6:
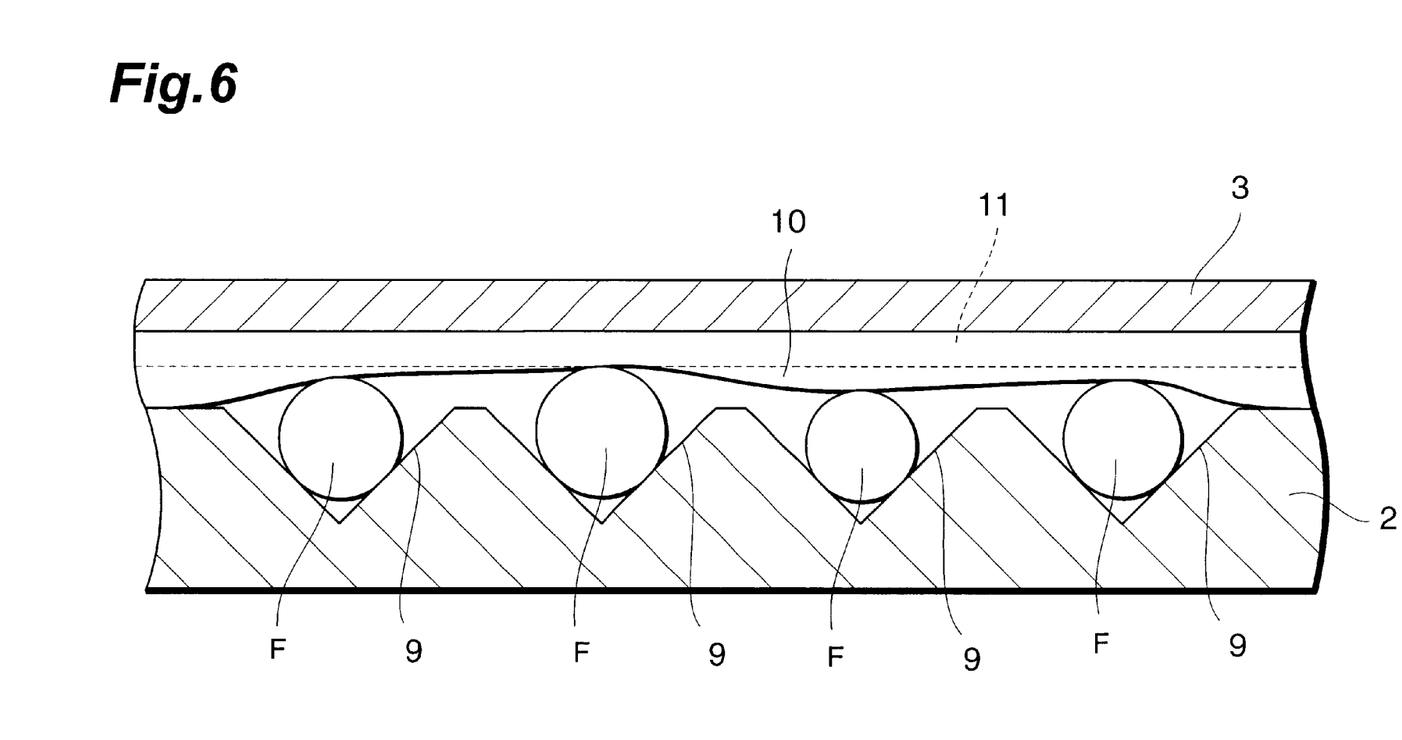

This applies not only to optical fibers F butting face to face but also to a plurality of optical fibers F arranged parallel to each other. Even if a plurality of optical fibers F arranged parallel to each other have a small diameter error due to a manufacturing error or the like, the small projections 10 deform in accordance with the diameters of the optical fibers F, as shown in FIG. 6. As a result, each optical fiber F is held reliably as it is pressed by the small projections 10 against the bottom portions of the positioning grooves 9.

Since the optical fibers F are pressed against the bottom portions of the positioning grooves 9 by utilizing the small deformation of the small projections 10, even if the depths of the positioning grooves 9 vary due to a manufacturing error, these variations can be absorbed. Since the recesses 11 are formed close to the small projections 10, the deformed portions of the small projections 10 can escape into the recesses 11. Thus, the small projections 10 can deform easily and the optical fibers F are held more reliably.

Since the small projections 10 are formed to have semispherical shapes and they extend perpendicularly to the extending directions of the positioning grooves 9 (i.e., the extending directions of the optical fibers F), the contact between the optical fibers F and small projections 10 starts in the form of point contact, and its contact increases as the small projections 10 deform. Since the contact between the optical fibers F and small projections 10 starts in the form of point contact, the pressure produced by the elastic restoring force of the clamper 4 is concentrated on one point, so that the small projections 10 can deform easily. As deformation progresses, the pressure is dispersed over a certain area, so no local load acts on the optical fibers F.

The projecting amount of the small projections 10 is preferably from 1 $\mu$m to 3 $\mu$m inclusive. If this amount is less than 1 $\mu$m, it is not sufficient for absorbing the diameter error of the optical fibers F by deformation of the small projections 10; if it exceeds 3 $\mu$m, it is not preferable as the engagement between the base member 2 and lid member 3 becomes unstable. The radius of curvature of the small projections 10 is preferably from 1 mm to 10 mm inclusive. If the radius of curvature is less than 1 mm, the contact area between the small projections 10 and optical fibers F becomes excessively small, so an external force locally acts on the optical fibers F. If the radius of curvature exceeds 10 mm, it is not preferable since the shapes of the small projections 10 become close to a flat surface and do not deform easily.

Figure 7:
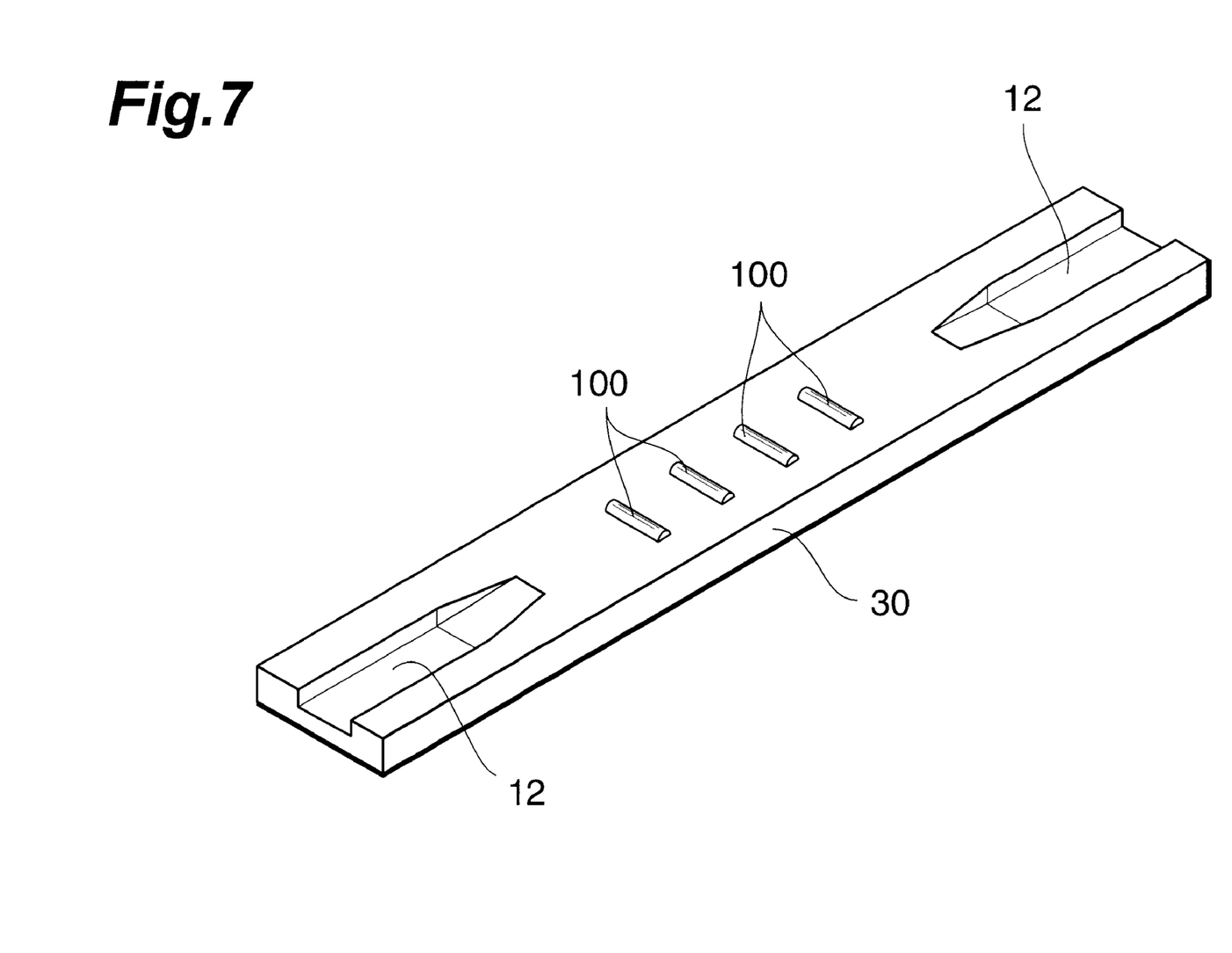
FIG. 7 is a perspective view showing the lid member of an optical fiber holder according to the third embodiment of the present invention.

FIG. 7 shows an optical fiber holder according to the third embodiment of the present invention. The holder of this embodiment is different from the holder 1B of the second embodiment described above only in its lid member. Therefore, in the following description, only a lid member 30 of this embodiment will be described, and a description on other portions will be omitted. How the holder is used is not different from the second embodiment described above, and a description thereof is also omitted.

In the lid member 30 of this embodiment, only small projections 100 with semicylindrical sections are formed at that portion which comes into contact with optical fibers F, i.e., that portion which opposes positioning grooves 9 when the lid member 30 is placed on a base member 2. Two small projections 100 are formed for each pair of opposing optical fibers F; a total of four small projections 100 are formed. Each small projection 100 extends over all the four positioning grooves 9. Each small projection 100 extends perpendicularly to the positioning grooves 9. In other words, each small projection 100 extends perpendicularly to the axial directions of the optical fibers F.

Figure 8:
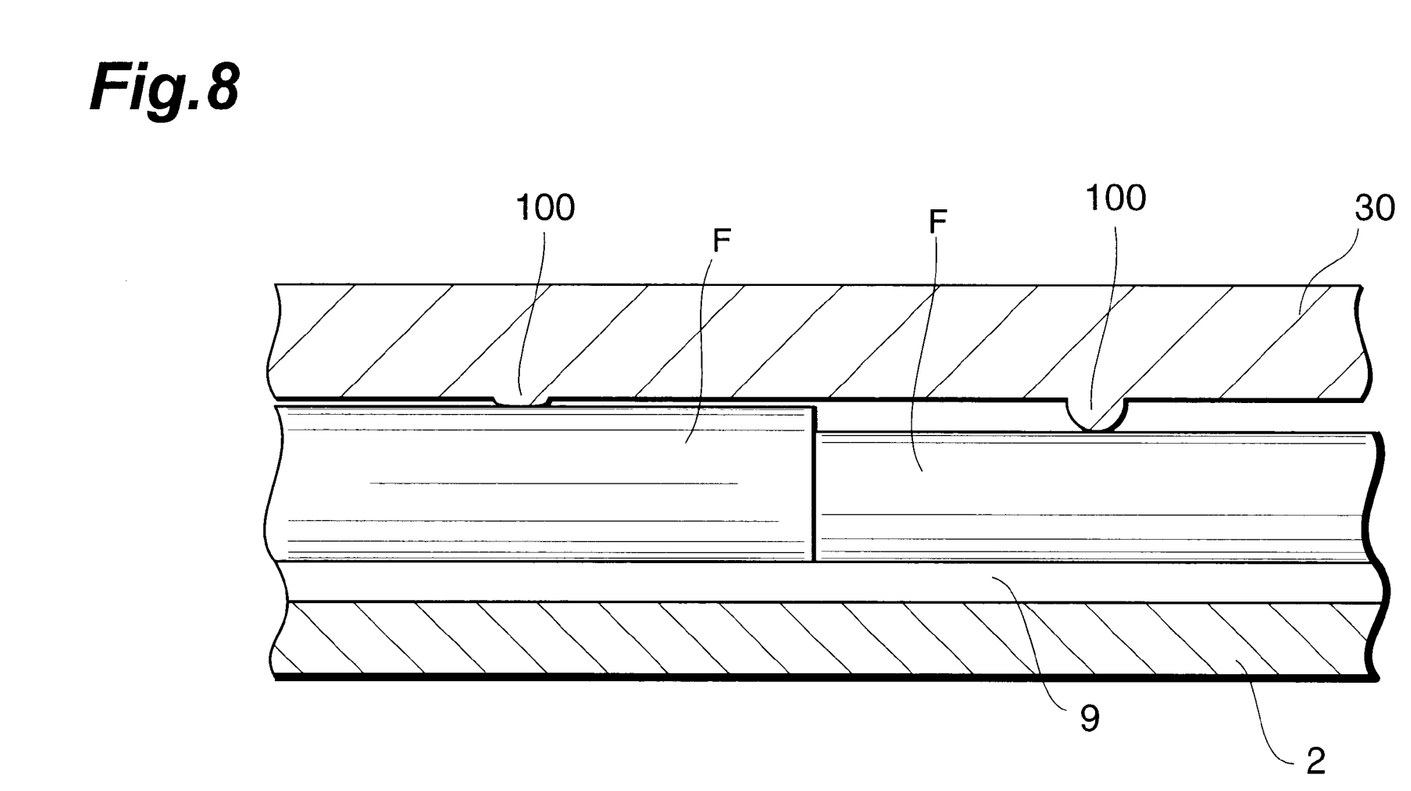
FIG. 8 is a longitudinal sectional view showing a state wherein optical fibers are held by the holder using this lid member.

When the optical fibers F butting face to face are to be held by the holder of this embodiment, since the elastic restoring force of a clamper 4 presses the lid member 30 and base member 2 toward each other, the optical fibers F are pressed by the small projections 100 against the bottom portions of the positioning grooves 9. Even if the opposing optical fibers F have a small diameter error due to a manufacturing error or the like, the small projections 100 which come into contact with the corresponding optical fibers F deform in accordance with the diameters of the respective optical fibers F. As a result, each optical fiber F is held reliably as it is pressed by the small projections 100 against the bottom portions of the positioning grooves 9. Although not shown, when a plurality of optical fibers F arranged parallel to each other are to be held, the small projections 100 also deform so that all the optical fibers F can be held reliably.

Figure 9:
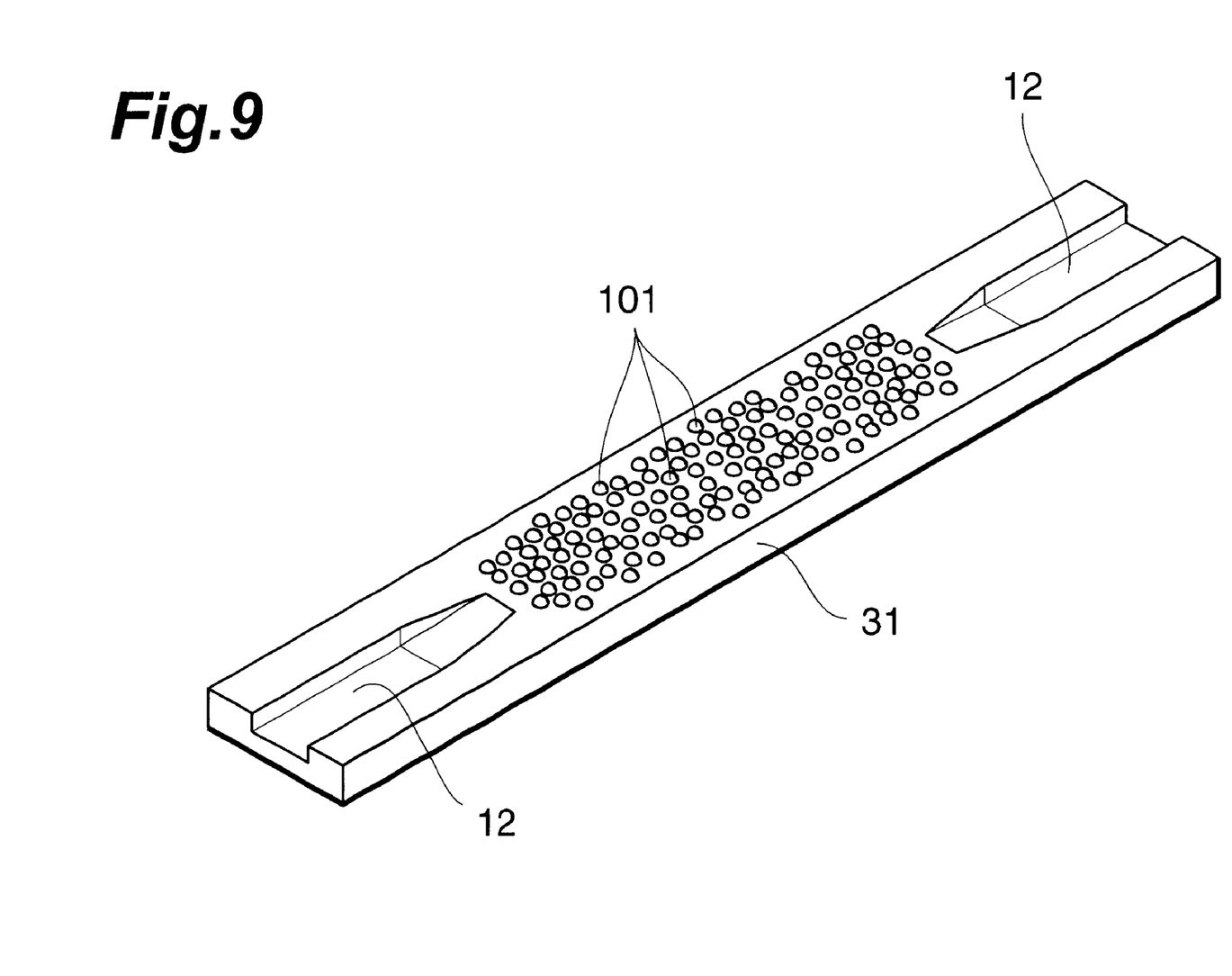
FIG. 9 is a perspective view showing the lid member of an optical fiber holder according to the fourth embodiment of the present invention.

FIG. 9 shows an optical fiber holder according to the fourth embodiment of the present invention. The holder of this embodiment is also different from the holder 1B of the second embodiment described above only in its lid member. Therefore, in the following description, only a lid member 31 of this embodiment will be described, and a description on other portions will be omitted. How the holder is used is also not different from second embodiment described above, and a description thereof is also omitted.

In the lid member 31 of this embodiment, a large number of small projections 101, each formed by cutting away part of a spherical shape randomly, are formed entirely at that portion which opposes positioning grooves 9 when the lid member 31 is placed on a base member 2. The distance among the small projections 101 is preferably 0.5 mm or less. In other words, an average of four or more small projections 101 are preferably arranged per 1 mm². Then, conditions as to the projecting amount and radius of curvature of the small projections described in the second embodiment can be satisfied easily. If pairs of projections are to be formed, the radius of curvature can be smaller as the force acting on each projection decreases.

When optical fibers F butting face to face are also to be held by the holder of this embodiment, the elastic restoring force of a clamper 4 presses the lid member 31 and base member 2 toward each other, and the optical fibers F are pressed by the small projections 101 against the bottom portions of the positioning grooves 9. Even if the opposing optical fibers F have a small diameter error due to a manufacturing error or the like, the small projections 101 which come into contact with the corresponding optical fibers F deform in accordance with the diameters of the respective optical fibers F. As a result, any optical fiber F is held reliably as it is pressed by the small projections 101 against the bottom portions of the positioning grooves 9.

Figure 10:
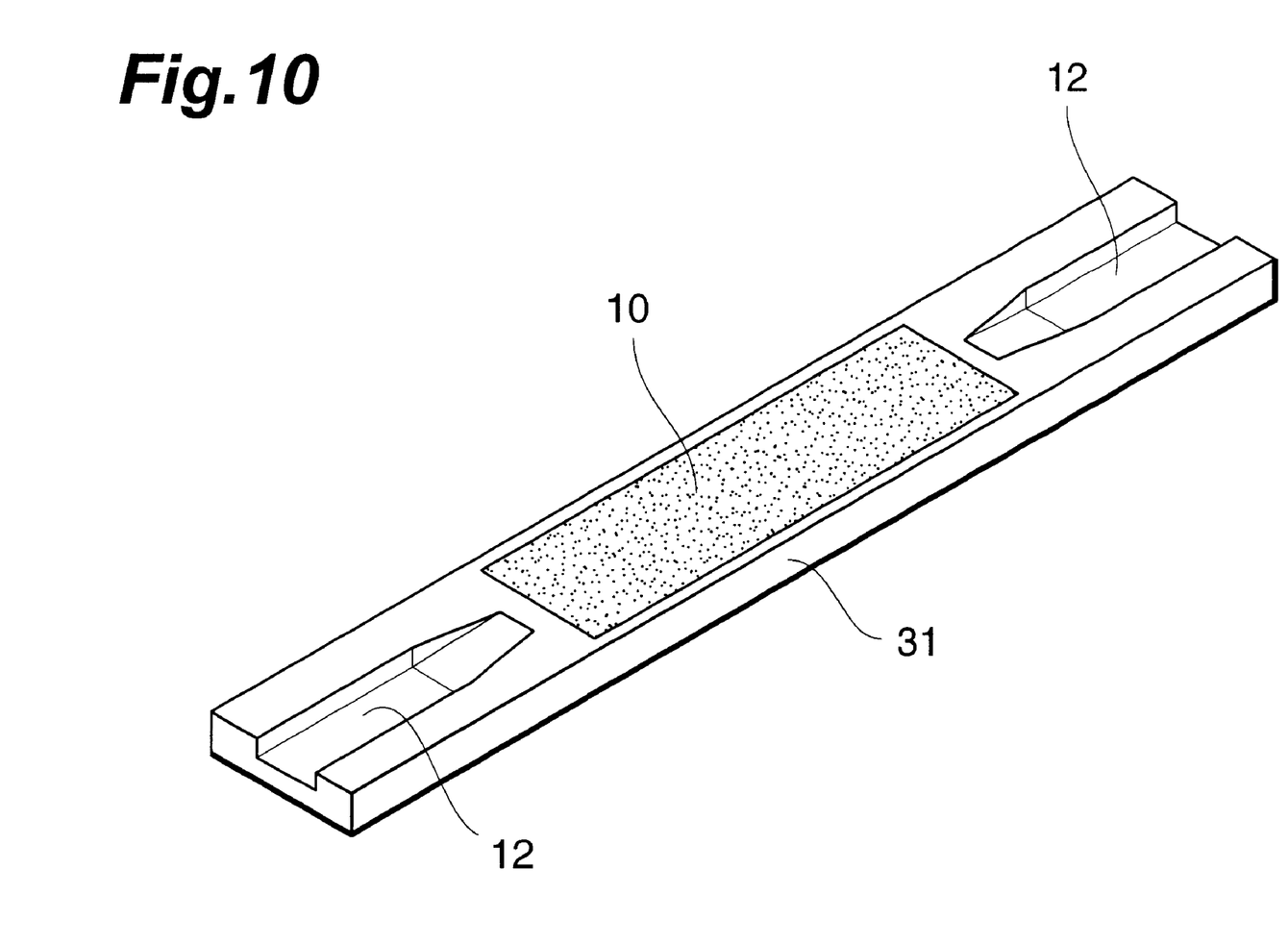
FIG. 10 is a perspective view showing the lid member of an optical fiber holder according to the fifth embodiment of the present invention.

Although the small projections are formed randomly in the fourth embodiment, they may be arranged regularly, e.g., in a comb shape. The lid member may have a coarse surface 104 with a large number of small projections, like a lid member 31 according to the fifth embodiment shown in FIG. 10. The coarse surface 104 can be formed by machining, by sandblast or the like, of a mold for integrally forming the lid member 31, a surface corresponding to the coarse surface 104, thereby forming microstructures with a height of approximately from 1 μm to 3 μm inclusive, and injecting a resin into this mold and hardening the resin.

In any of the embodiments described above, any diameter error of the optical fibers F is absorbed by deforming the small projections 10, 100, 101, or 102 formed on the lid member. Alternatively, as shown in FIG. 11, small projections 103 may be formed on the surface of a positioning groove 91, with a V-shaped section, on a base member 21, and any diameter error of an optical fiber F may be absorbed by deformation of the small projections 103.

Figure 11:
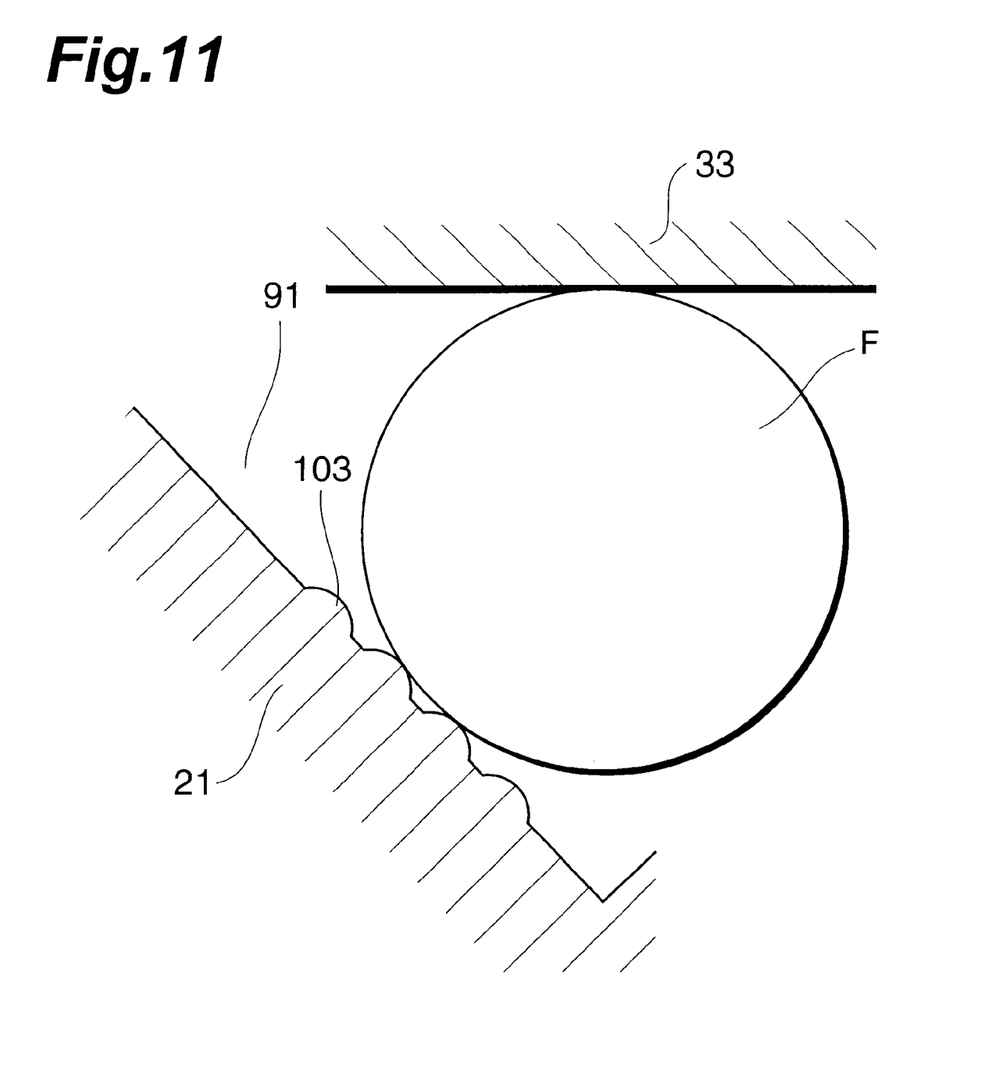
FIG. 11 is a partial cross-sectional view showing an optical fiber holder according to the sixth embodiment of the present invention.

In FIG. 11, in that portion of the inner surface of the positioning groove 91 which comes into contact with the optical fiber F, small projections 103 are formed to extend in the direction in which the positioning groove 91 extends. The small projections 103 deform when the optical fiber F is pressed by a lid member 33 against the bottom portion of the positioning groove 91. Small projections formed by cutting away part of spherical shapes may be formed on the inner surface of the positioning groove 91. Alternatively, part of the inner surface of the positioning groove 91 may be a rough surface.

The present invention is not limited to the embodiments described above. For example, the present invention can be applied to a "single-type" mechanical splicing optical connector for holding single-core optical fiber cables by butting them face to face, and not to a "multi-type" mechanical splicing optical connector for holding ribbon multi-core optical fiber cables by butting them face to face. The positioning grooves need not have V-shaped sections but can have, e.g., U-shaped or round sections.

In any of the second to fifth embodiments described above, an optical fiber F with exposed optical fiber cables and the coating portions of the optical fiber cables T are held by one lid member. Alternatively, the lid member may be divided into three portions, i.e., a portion for holding exposed and abutted optical fibers F, and portions for holding the coatings of the optical fiber cables T on the two sides of the exposed and abutted optical fibers F.

In the embodiments described above, the lid member and base member are made of the same resin. Alternatively, the member with the small projections (the lid member in the first to fifth embodiments) may be made of an elastic member softener than the other member. In this case, the small projections tend to deform easily. As a result, misalignment of the optical fibers and a nonuniform stress on the optical fibers caused by nonuniform deformation of the small projections are suppressed.

In the above embodiments, small projections are formed only either the lid member or base member. However, small projections may be formed on both the lid member and positioning grooves. In this case, the small projections deform on both surfaces that sandwich optical fibers, so that any diameter error of the optical fibers can be absorbed, and the optical fibers can be aligned more reliably.

Industrial Applicability

The present invention is suitably applied to a mechanical clamping optical connector or mechanical splicing optical connector.

What is claimed is:

1. An optical fiber holder for holding a plurality of optical fibers by arranging the optical fibers parallel to each other, comprising:

a base member with a plurality of parallel positioning grooves for positioning and aligning the plurality of optical fibers;

a lid member covering said plurality of positioning grooves to fix the plurality of optical fibers, arranged in said positioning grooves, by pressing against bottom portions of said positioning grooves; and one or more small projections with a height from 1 μm to 3 μm inclusive formed on a contacting portion of at least either one of said lid member and said positioning grooves to contact with each of the optical fibers.

2. An optical fiber holder for holding opposing optical fibers by abutting end faces thereof against each other, comprising:

a base member with at least one positioning groove for positioning and aligning the opposing optical fibers;

a lid member covering said positioning groove to fix the optical fibers, arranged in said positioning groove to oppose each other, by pressing against a bottom portion of said positioning groove; and one or more small projections with a height from 1 μm to 3 μm inclusive formed on a contacting portion of at least either one of said lid member and said positioning grooves to contact with each of the optical fibers.

3. An optical fiber holder according to claim 1, further comprises one or more recesses each close to said small projection.

4. An optical fiber holder according to claim 1, wherein said small projection is formed on said lid member and has a semicylindrical shape extending in a direction perpendicular to a direction in which said positioning groove extends.

5. An optical fiber holder according to claim 1, wherein said small projections are arranged on a wall surface of said lid member or said positioning groove at an interval of not more than 0.5 mm.

6. An optical fiber holder according to claim 1, wherein one of said base member and said lid member which has said small projection is made of a member with a larger elasticity than that of the other.

7. An optical fiber holder according to claim 2, further comprising one or more recesses each close to said small projection.

8. An optical fiber holder according to claim 2, wherein said small projection is formed or said lid member and has a semicylindrical shape extending in a direction perpendicular to a direction in which said positioning groove extends.

9. An optical fiber holder according to claim 2, wherein said small projections are arranged on a wall surface of said lid member or said positioning groove at an interval of not more than 0.5 mm.

10. An optical fiber holder according to claim 2, wherein one of said base member and said lid member which has said small projection is made of a member with a larger elasticity than that of the other.

* * * * *